United States Patent
Gorrepati et al.

(10) Patent No.: US 11,336,683 B2
(45) Date of Patent: May 17, 2022

(54) SYSTEMS AND METHODS FOR PREVENTING REPLAY ATTACKS

(71) Applicant: Citrix Systems, Inc., Fort Lauderdale, FL (US)

(72) Inventors: Venkata Subba Rao Gorrepati, Bengaluru (IN); Jubin Jose, Bengaluru (IN); Ranjith Nath, Bengaluru (IN); Sathaiah Dontula, Bengaluru (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 97 days.

(21) Appl. No.: 16/654,867

(22) Filed: Oct. 16, 2019

(65) Prior Publication Data

US 2021/0120033 A1 Apr. 22, 2021

(51) Int. Cl.
*H04L 29/06* (2006.01)

(52) U.S. Cl.
CPC ........ *H04L 63/1466* (2013.01); *H04L 63/126* (2013.01); *H04L 63/1416* (2013.01)

(58) Field of Classification Search
CPC .............. H04L 63/1466; H04L 63/126; H04L 63/1416
USPC .......................................................... 726/24
See application file for complete search history.

(56) References Cited

U.S. PATENT DOCUMENTS

| | | | | |
|---|---|---|---|---|
| 5,490,145 A | * | 2/1996 | Tanabe | H04L 12/433 370/452 |
| 5,883,893 A | * | 3/1999 | Rumer | H04Q 11/0478 370/395.6 |
| 6,438,603 B1 | * | 8/2002 | Ogus | H04L 47/10 370/238 |

(Continued)

FOREIGN PATENT DOCUMENTS

| | | |
|---|---|---|
| CN | 103023624 A * | 4/2013 |
| EP | 2 211 479 A1 | 7/2010 |

(Continued)

OTHER PUBLICATIONS

Naveed, Murtaza, Abid Ali Minhas, and Jehanzeb Ahmad. "Improved authentication algorithm for UMTS." In Proceedings of the 2009 International Conference on Hybrid Information Technology, pp. 327-332. 2009. (Year: 2009).*

(Continued)

*Primary Examiner* — Harris C Wang
*Assistant Examiner* — Walter J Malinowski
(74) *Attorney, Agent, or Firm* — Foley & Lardner LLP

(57) ABSTRACT

Disclosed herein includes a system, a method, and a device for preventing replay attacks in a cluster. A first node in the cluster having a plurality of nodes can receive an indication of a node event. The first node can access a first sequence number from a storage corresponding to a previous communication between the plurality of nodes. The first node can adjust the first sequence number by a delta indicative of an average number of communications between the plurality (Continued)

of nodes in the cluster in a determined time period to generate a second sequence number. The first node can transmit a packet including the second sequence number to the plurality of nodes in the cluster. The second sequence number can be used by the plurality of nodes to reset a starting sequence number for communications between the plurality of nodes to prevent replay attacks in the cluster.

20 Claims, 11 Drawing Sheets

(56) References Cited

U.S. PATENT DOCUMENTS

| | | | | |
|---|---|---|---|---|
| 6,502,192 | B1* | 12/2002 | Nguyen | H04L 63/0428 709/229 |
| 7,889,653 | B2* | 2/2011 | Grob-Lipski | H04L 65/80 370/230.1 |
| 7,969,997 | B1* | 6/2011 | Noh | H04L 47/15 370/408 |
| 8,332,503 | B2* | 12/2012 | Takagi | H04L 43/00 709/224 |
| 9,246,876 | B1* | 1/2016 | Melam | H04L 12/4641 |
| 9,979,550 | B1* | 5/2018 | Fiedler | H04L 9/14 |
| 10,630,466 | B1* | 4/2020 | Wilbur | H04L 9/0838 |
| 10,929,041 | B1* | 2/2021 | Ping | G06F 3/067 |
| 2002/0124169 | A1 | 9/2002 | Agrawal et al. | |
| 2002/0157037 | A1 | 10/2002 | Kroeger et al. | |
| 2004/0236937 | A1 | 11/2004 | Perkins et al. | |
| 2005/0086342 | A1* | 4/2005 | Burt | H04L 43/0811 709/224 |
| 2005/0243625 | A1* | 11/2005 | Miyazawa | H04N 21/4305 365/222 |
| 2006/0120396 | A1* | 6/2006 | Hasegawa | H04L 12/1863 370/432 |
| 2009/0046581 | A1* | 2/2009 | Eswaran | H04L 41/147 370/230 |
| 2009/0049178 | A1* | 2/2009 | Dierks, Jr. | H04L 41/5019 709/227 |
| 2009/0067416 | A1* | 3/2009 | Tavares | H04L 1/1607 370/355 |
| 2009/0141722 | A1* | 6/2009 | Hall, Jr. | H04L 45/02 370/392 |
| 2009/0161578 | A1* | 6/2009 | Yeung | H04L 45/02 370/254 |
| 2009/0213797 | A1* | 8/2009 | Li | H04W 12/04 370/328 |
| 2010/0011220 | A1* | 1/2010 | Zhao | H04L 9/0844 713/182 |
| 2010/0313024 | A1 | 12/2010 | Weniger et al. | |
| 2011/0153862 | A1* | 6/2011 | Roosta | H04L 63/1441 709/234 |
| 2012/0144018 | A1* | 6/2012 | Fried | H04L 12/6418 709/224 |
| 2013/0198516 | A1* | 8/2013 | Fenton | G06F 21/31 713/168 |
| 2014/0068103 | A1* | 3/2014 | Gyambavantha | H04L 47/2475 709/238 |
| 2014/0105057 | A1* | 4/2014 | Liu | H04L 1/1896 370/252 |
| 2014/0206342 | A1* | 7/2014 | Zhou | H04J 11/0023 455/422.1 |
| 2015/0007314 | A1* | 1/2015 | Vaughan | H04L 63/1425 726/23 |
| 2015/0063350 | A1* | 3/2015 | Sundaram | G06F 11/3636 370/389 |
| 2015/0304060 | A1* | 10/2015 | Xiao | H04L 12/6418 370/503 |
| 2016/0036700 | A1* | 2/2016 | Unnimadhavan | H04L 45/74 370/392 |
| 2016/0057703 | A1* | 2/2016 | Benoit | H04W 52/0229 370/311 |
| 2016/0080340 | A1* | 3/2016 | Oba | H04L 9/0833 713/176 |
| 2016/0218979 | A1* | 7/2016 | Roh | H04L 43/16 |
| 2017/0012861 | A1* | 1/2017 | Blumenthal | H04L 49/351 |
| 2017/0105142 | A1* | 4/2017 | Hecht | H04L 67/02 |
| 2017/0168756 | A1* | 6/2017 | Yamada | G06F 3/0619 |
| 2017/0295019 | A1* | 10/2017 | Fukuda | H04L 9/3226 |
| 2018/0070327 | A1* | 3/2018 | Qureshi | H04W 56/0055 |
| 2018/0198890 | A1* | 7/2018 | Dhanabalan | H04L 43/10 |
| 2018/0212818 | A1* | 7/2018 | Ide | H04L 43/0823 |
| 2018/0255036 | A1* | 9/2018 | Fiedler | H04L 63/0485 |
| 2018/0262420 | A1* | 9/2018 | Jaffer | H04L 47/34 |
| 2018/0295516 | A1 | 10/2018 | Chen et al. | |
| 2018/0365044 | A1* | 12/2018 | Movsisyan | H04L 41/0816 |
| 2019/0037443 | A1* | 1/2019 | Lee | H04W 28/0231 |
| 2019/0075578 | A1* | 3/2019 | Kim | H04B 17/364 |
| 2019/0116071 | A1* | 4/2019 | VerSteeg | G01D 21/00 |
| 2019/0297533 | A1 | 9/2019 | Liedes et al. | |
| 2020/0092217 | A1* | 3/2020 | Flomen | H04L 29/06523 |
| 2020/0107165 | A1* | 4/2020 | Pai | H04L 9/3297 |
| 2020/0177630 | A1* | 6/2020 | Penner | H04L 63/168 |
| 2020/0183745 | A1* | 6/2020 | Ernst | G06F 9/5005 |
| 2020/0195420 | A1* | 6/2020 | Ard | H04L 9/3271 |
| 2020/0365185 | A1* | 11/2020 | Vittal | G11B 27/007 |
| 2020/0374217 | A1* | 11/2020 | Zhu | H04L 47/34 |
| 2021/0067457 | A1* | 3/2021 | Wang | H04L 1/0023 |

FOREIGN PATENT DOCUMENTS

| | | | | |
|---|---|---|---|---|
| EP | 2211479 A1 | * | 7/2010 | H04B 3/54 |
| EP | 3 082 207 A1 | | 10/2016 | |
| EP | 3082207 A1 | * | 10/2016 | H04L 63/1466 |
| JP | 60145733 A | * | 8/1985 | H04B 7/2123 |

OTHER PUBLICATIONS

Guo, JiangHong, and ZhiChu Zhong. "Efficient and reliable broadcast protocol for clustered wireless sensor networks." In 2010 International Conference on Computational Intelligence and Security, pp. 488-492. IEEE, 2010. (Year: 2010).*

Chen, Guanlin, and Ying Wu. "A wireless intrusion Alerts Clustering Method for mobile internet." China Communications 13, No. 4 (2016): 108-118. (Year: 2016).*

Shacham, N. A. C. H. U. M. "Packet recovery and error correction in high-speed wide-area networks." In IEEE Military Communications Conference,'Bridging the Gap. Interoperability, Survivability, Security', pp. 551-557. IEEE, 1989. (Year: 1989).*

Raymond, David R., Randy C. Marchany, and Scott F. Midkiff. "Scalable, cluster-based anti-replay protection for wireless sensor networks." In 2007 IEEE SMC Information Assurance and Security Workshop, pp. 127-134. IEEE, 2007. (Year: 2007).*

Lee, Taeho, Christos Pappas, Adrian Perrig, Virgil Gligor, and Yih-Chun Hu. "The case for in-network replay suppression." In Proceedings of the 2017 ACM on Asia Conference on Computerand Communications Security, pp. 862-873. 2017. (Year: 2017).*

Singh, Gursharan, and Pooja Gupta. "To Alleviate The Flooding Attack and Intensify Efficiency in MANET." In 2018 First International Conference on Secure Cyber Computing and Communication (ICSCCC), pp. 87-94. IEEE, 2018. (Year: 2018).*

Open Smart Grid Protocol (OSGP), ETSI GS OSG 001—V1.1.1, European Telecommunications Standard Institute, Sophia Antipolis Cedex, France, Jan. 2012, pp. 1-256.

International Search Report and Written Opinion on PCT Appl. No. PCT/US2020/054742 dated Dec. 16, 2020.

Mikhalev, Vasily et al., "Towards End-to-End Data Protection in Low-Power Networks", Dec. 22, 2017 (Dec. 22, 2017), Big Data Analytics in the Social and Ubiquitous Context: 5th International Workshop on Modeling Social Media, 5thInternational Workshop on Mining Ubiquitous and Social Environments, Muse 2014 and First International Workshop on Machine LE; p. 8-13.

* cited by examiner

SYSTEMS AND METHODS FOR PREVENTING REPLAY ATTACKS

FIELD OF DISCLOSURE

The present disclosure is generally related to display systems and methods, including but not limited to systems and methods for preventing replay attacks.

BACKGROUND

Network devices can be connected or grouped together through multiple virtual wide area networks (WAN) or other networks together to form a cluster. Communications between the nodes forming the cluster can be prone to malicious attacks that impact the cluster functionality. For example, the communications can be attacked through use of packet tampering and packet replay attacks.

SUMMARY

Devices, systems and methods for preventing replay attacks within a cluster are provided herein. In embodiments, unique sequence numbers can be generated and included in packets used in node communication within the cluster to prevent replay attacks or other forms of packet tampering of communications between the nodes of the cluster. For example, the nodes can generate nonce sequence numbers for packets to be transmitted that can be adjusted using a determined integer value or determined delta value to distinguish the respective packet from a previous communication including a previous sequence number. In embodiments, the determined integer value can be based in part on a previous sequence number and the determined delta value can be based in part on a number of communications within the cluster over a determined time period. The sequence numbers can be generated based in part on whether the communication is responsive to a node event (e.g., node reboot, node reset, node deployment) within the cluster or part of normal communication within the cluster. Receiving nodes can verify the packets by comparing the adjusted sequence number to an expected sequence number or threshold number. Based on the comparison of the adjusted sequence number to the expected sequence number or threshold number, the packet can either be accepted at the receiving nodes, or the packet can be rejected or dropped at the receiving nodes. Thus, the systems and methods described herein can prevent malicious attacks, such as but not limited to, replay attacks or packet tampering within the cluster through unique sequence number generation.

In at least one aspect, a method is provided. The method can include receiving, by a first node in a cluster having a plurality of nodes, an indication of a node event of the cluster. The method can include accessing, by the first node, a first sequence number from a storage. The first sequence number can be associated with a previous communication between the plurality of nodes in the cluster. The method can include adjusting, by the first node, the first sequence number by a delta indicative of an average number of communications between the plurality of nodes in the cluster in a determined time period to generate a second sequence number. The method can include storing, by the first node, the second sequence number to the storage responsive to the node event. The method can include transmitting, by the first node, a packet including the second sequence number to the plurality of nodes in the cluster. The second sequence number can be used by the plurality of nodes to reset a starting sequence number for communications between the plurality of nodes to prevent replay attacks in the cluster.

In embodiments, the node event can include at least one of a node reboot, a node reset, a node upgrade or a node deployment of the cluster. The method can include generating the second sequence number as a nonce sequence number having a 64 bit value. The method can include encrypting, by the first node, the packet including the second sequence number and transmitting, by the first node, the packet with a hash-based message authentication code to the plurality of nodes of the cluster. The method can include receiving, by nodes of the plurality of nodes, the packet including the second sequence number and storing, by the nodes of the plurality of nodes and responsive to the node event, the second sequence numbers to storage of the respective nodes.

In embodiments, the method can include storing, by each node of the plurality of nodes, subsequent sequence numbers used in communication between the plurality of nodes to storage of the respective nodes at intervals corresponding to the determine time period. The method can include determining, by the first node, the average number of communications between the plurality of nodes in the cluster in the determined time period and multiplying, by the first node, the average number of communications by the determined time period to generate the delta. The method can include authenticating, by a second node of the plurality of nodes, the packet using a hash-based message authentication code, the packet including the second sequence number. The method can include determining, by the second node, the second sequence number is greater than the threshold number. The method can include storing, by the second node responsive to the node event and the determination, the second sequence number to a storage of the second node.

In embodiments, the method can include generating, by the first node, a second packet for transmission to the plurality of nodes of the cluster independent of the node event. The method can include accessing, by the first node, the second sequence number from the storage of the first node. The method can include adjusting, by the first node, the second sequence number by an integer value to generate a third sequence number. The integer value can be less than the delta. The method can include transmitting, by the first node, a second packet including the third sequence number to the plurality of nodes in the cluster.

The method can include receiving, by one or more nodes of the plurality of nodes, the second packet including the third sequence number. The method can include comparing, by the one or more nodes, the third sequence number to the second sequence number to determine if the third sequence number is greater than the second sequence number. The method can include accepting, by the one or more nodes, the second packet responsive to determining that the third sequence number is greater than the second sequence number. The method can include rejecting, by the one or more nodes, the second packet responsive to determining the third sequence number is less than the second sequence number.

In at least one aspect, a method is provided. The method can include receiving, by a first node in a cluster having a plurality of nodes, a packet from a second node in the cluster responsive to a node event of the cluster. The method can include identifying, by the first node, a first sequence number included within the packet. The method can include accessing, by the first node, a second sequence number from a storage. The second sequence number can be indicative of a sequence number used in a previous communication between the plurality of nodes in the cluster. The method can include adjusting, by the first node, the second sequence number by a delta indicative of an average number of communications between the plurality of nodes in the cluster in a determined time period to generate a threshold number. The method can include comparing, by the first node, the first sequence number to the threshold number to determine if the sequence number is greater than or less than the threshold number and process the packet at the first node when the sequence number is greater than or less than the threshold number.

In embodiments, the method can include accepting, by the first node, the packet responsive to determining that the first sequence number is greater than the threshold number. The method can include storing, by the first node responsive to the node event, the first sequence number to the storage of the first node to replace the second sequence number. The method can include rejecting, by the first node, the packet responsive to determining the sequence number is less than the threshold number. The method can include receiving, by multiple nodes of the plurality of nodes, the packet from the second node in the cluster responsive to the node event of the cluster, the packet including the first sequence number. The method can include storing, by each of the multiple nodes, the first sequence number to storage of the respective nodes responsive to determining that the first sequence number is greater than the threshold number at the determined time interval. The method can include storing, by each node of the plurality of nodes, subsequent sequence numbers used in communication between the plurality of nodes to storage of the respective nodes at intervals corresponding to the determine time period.

In at least one aspect, a system is provided. The system can include a first node in a cluster having a plurality of nodes. The first node can include one or more processors coupled to memory. The one or more processors can be configured to receive an indication of a node event of the cluster. The one or more processors can be configured to access a first sequence number from a storage. The first sequence number can be associated with a previous communication between the plurality of nodes in the cluster. The one or more processors can be configured to adjust the first sequence number by a delta indicative of an average number of communications between the plurality of nodes in the cluster in a determined time period to generate a second sequence number. The one or more processors can be configured to store the second sequence number to the storage responsive to the node event. The one or more processors can be configured to transmit a packet including the second sequence number to the plurality of nodes in the cluster. The second sequence number can be used by the plurality of nodes to reset a starting sequence number for communications between the plurality of nodes to prevent replay attacks in the cluster.

In embodiments, the one or more processors can be configured to encrypt the packet including the second sequence number. The one or more processors can be configured to transmit the packet with a hash-based message authentication code to the plurality of nodes of the cluster. The one or more processors can be configured to determine the average number of communications between the plurality of nodes in the cluster in the determined time period. The one or more processors can be configured to multiply the average number of communications by the determined time period to generate the delta.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes a network environment and computing environment which may be useful for practicing embodiments described herein.

Section B describes embodiments of systems and methods for delivering a computing environment to a remote user.

Section C describes embodiments of systems and methods for virtualizing an application delivery controller.

Section D describes embodiments of devices, systems and methods for preventing replay attacks within a cluster.

A. Network and Computing Environment

Figure 1A:
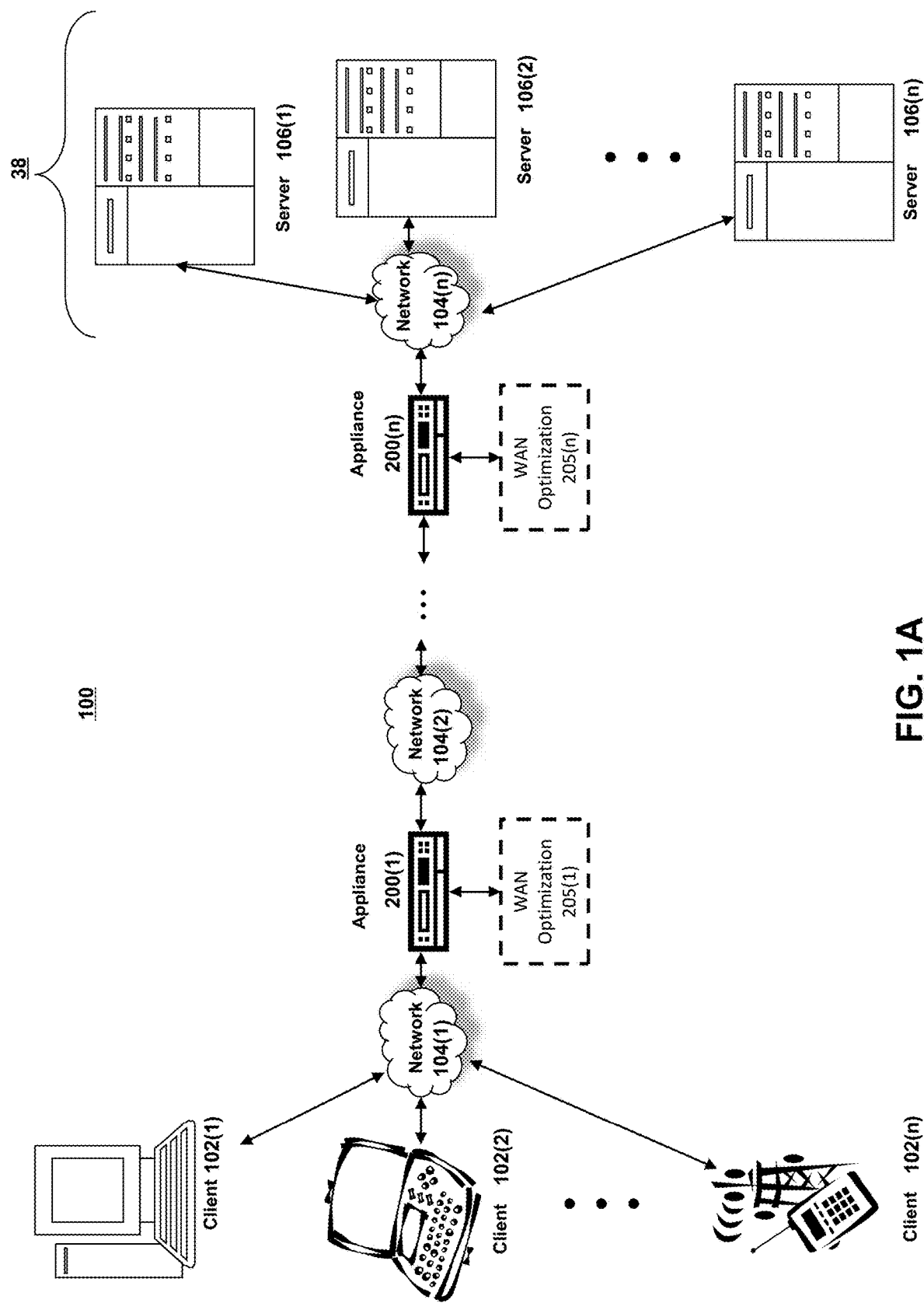
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
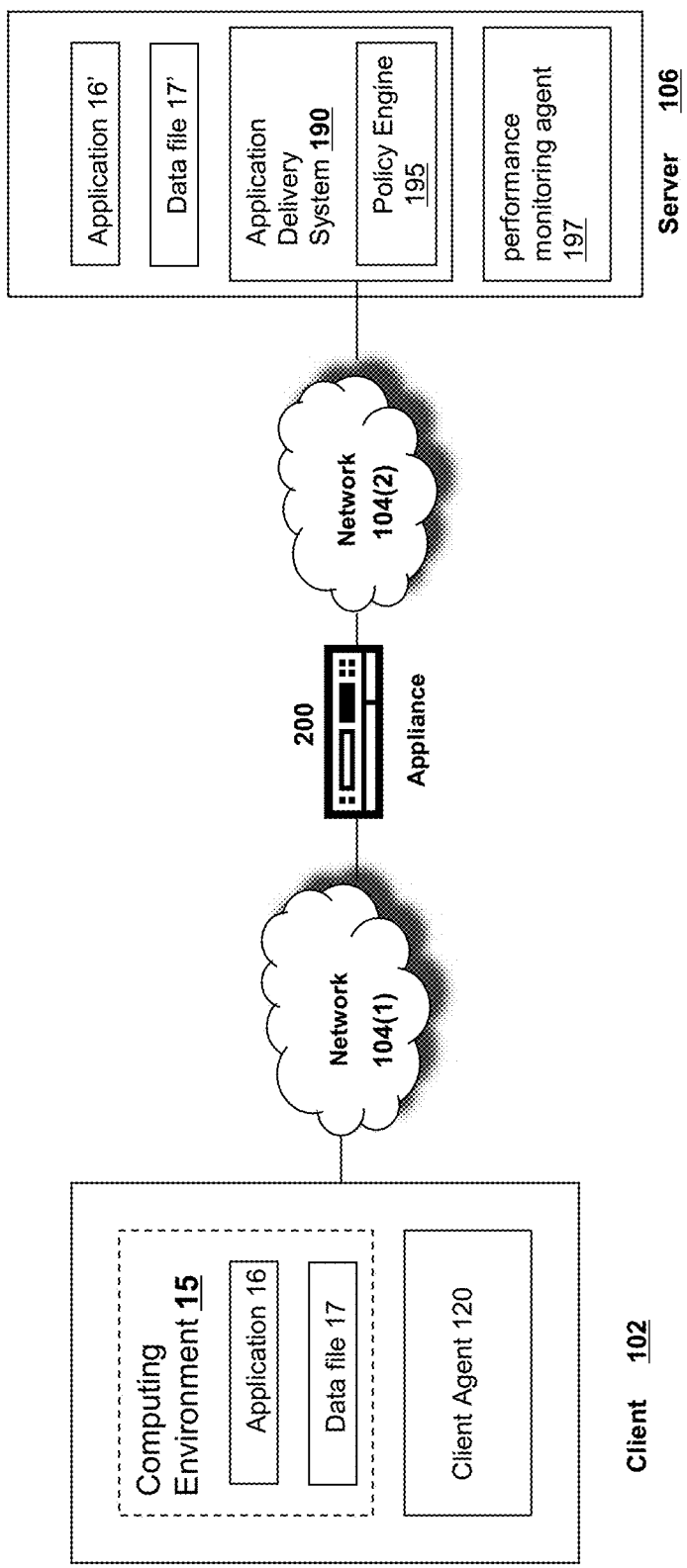
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
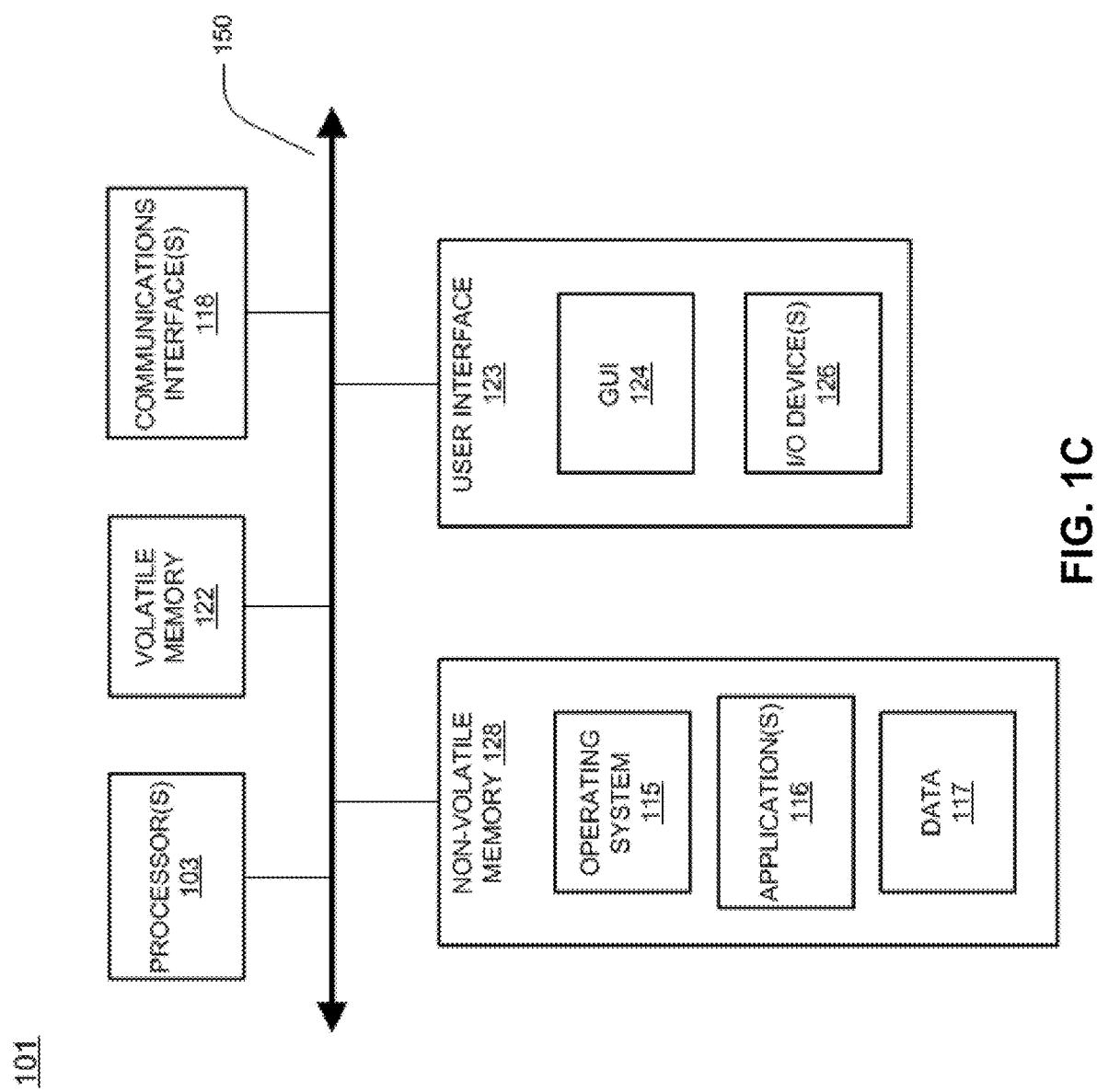
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 1D:
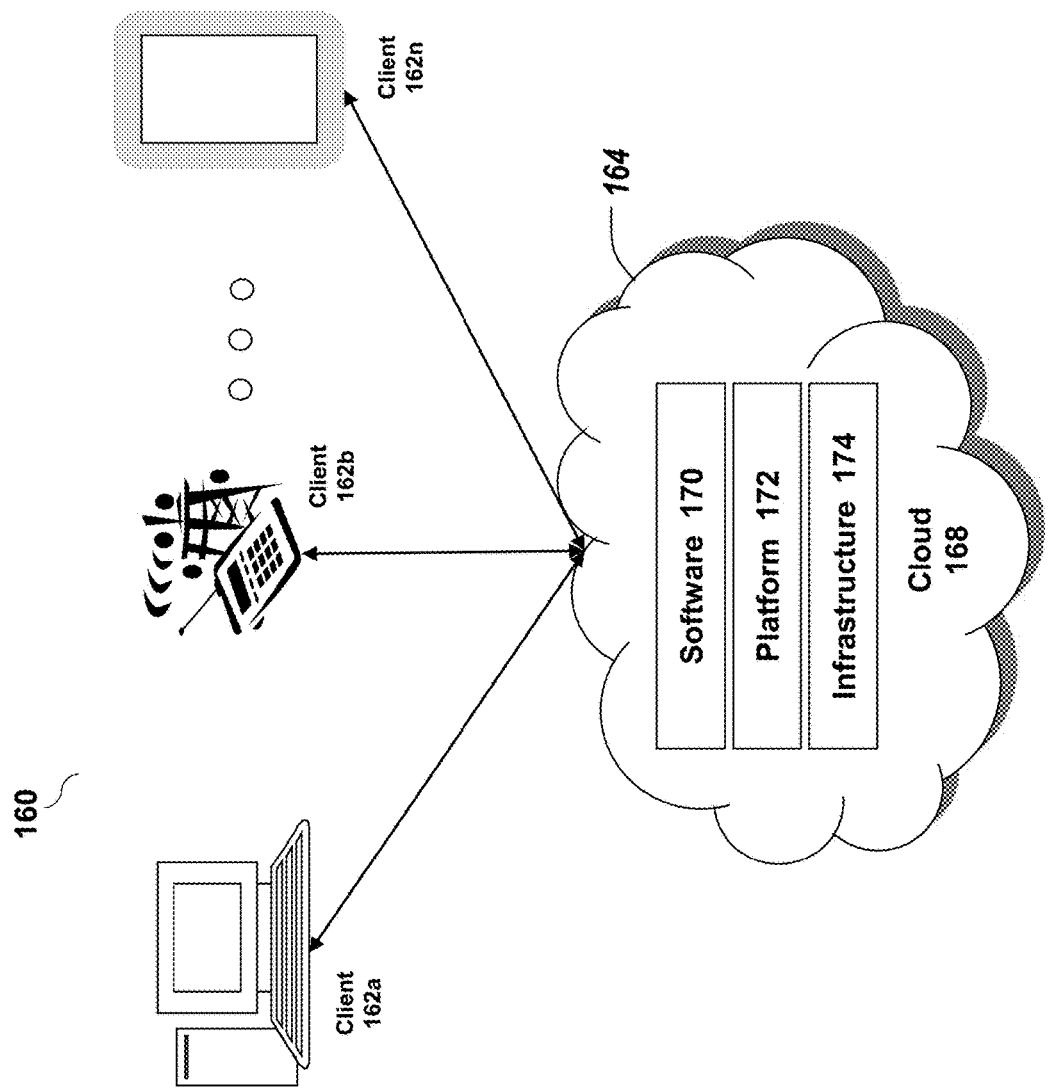
FIG. 1D is a block diagram depicting a computing environment comprising client device in communication with cloud service providers.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 160 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., Google Compute Engine provided by Google Inc. of Mountain View, Calif., or others. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and others. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
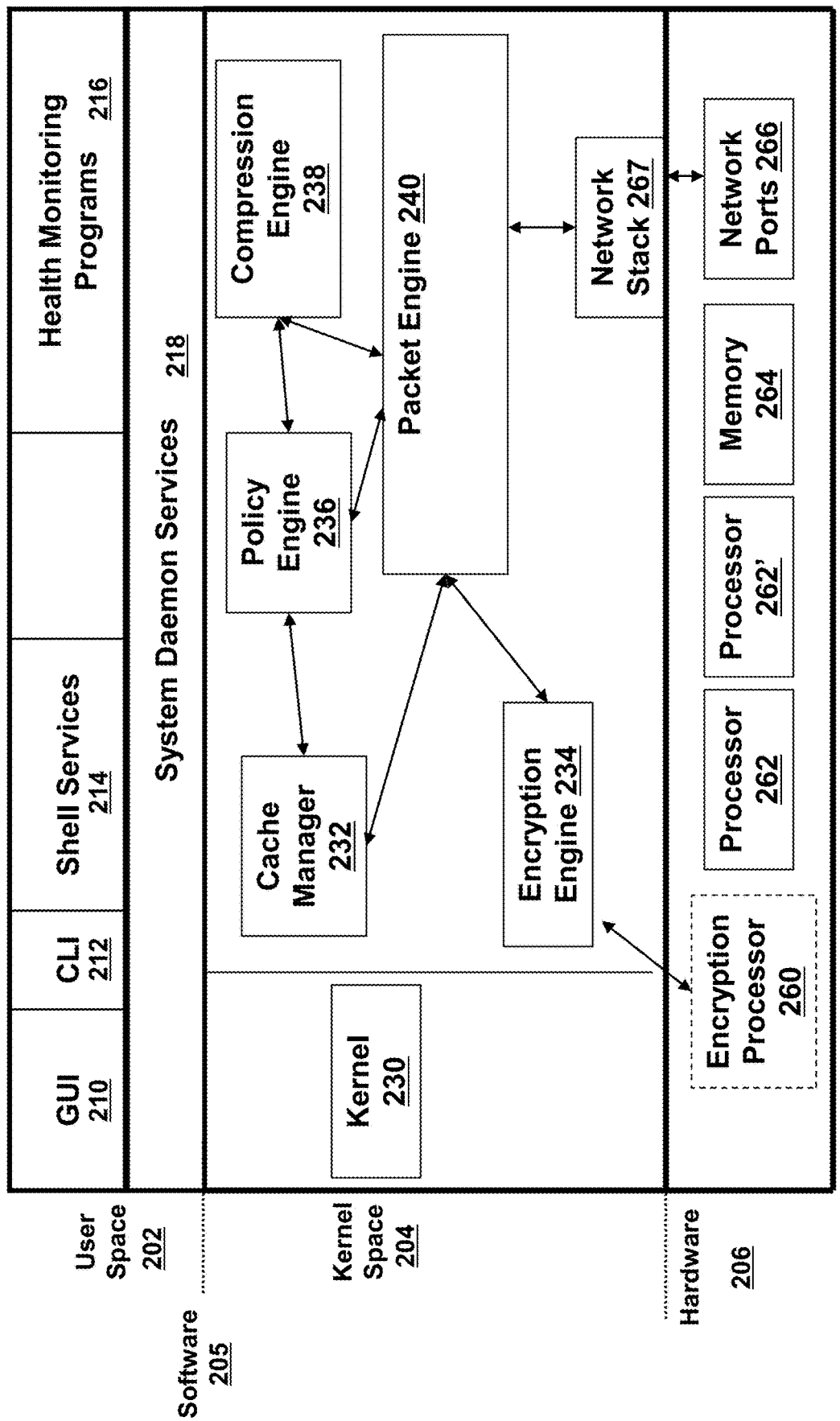
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
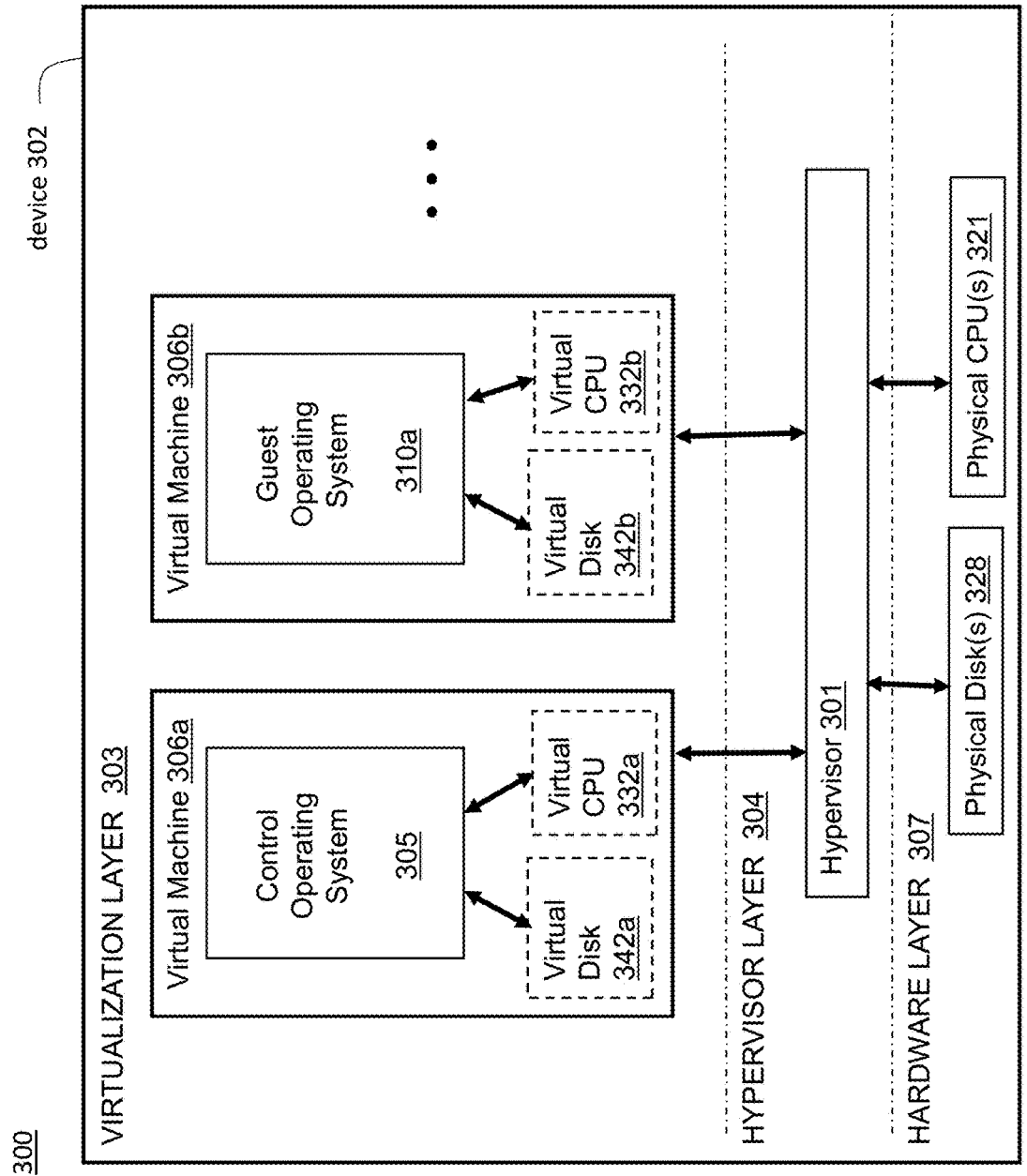
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. A plurality of appliances 200 or other computing devices (e.g., nodes) may be joined into a single cluster. A cluster may operate as an application server, network storage server, backup service, or any other type of computing device to perform many of the functions of appliances 200 and/or 205.

D. Preventing Replay Attacks in a Cluster

Devices, systems and methods for preventing replay attacks and packet tampering in a cluster are provided herein. The cluster can include a plurality of nodes (e.g., applications) that generate packets having unique sequence numbers for communications between the nodes such that receiving nodes can verify the integrity of a received packet to determine to accept the packet or reject (e.g., drop) the packet based in part on the sequence number. The sequence numbers can be generated to prevent malicious attacks through packet manipulation or replay attacks that use previous packet information to attack or access critical data at the respective node.

In cluster and cloud deployments, nodes can exchange information (e.g., state information) or communicate using heartbeat techniques and network packets. The packet exchange can be less prone to attacks in a controlled or protected network. However, in a cluster or cloud deployment, the packet communication or traffic can be prone to malicious attacks that impact or reduce the cluster functionality. For example, the malicious attacks can include, but not limited to, packet tampering or packet replay attacks. The attacks can lead or cause to change a cluster state that is exchanged over heartbeat communications and impact the cluster functionality.

The systems and methods described herein can protect or prevent against packet tampering and packet replay attacks through hashed based messaging codes transmitted with packets and unique sequence number generation included within the packets. For example, the nodes can transmit packets to include or be transmitted with hash-based message authentication codes (HMAC) to protect against packet tampering. The nodes can generate unique sequence numbers to be included with a packet that are incremented or modified based in part on a previous sequence number and/or an average number of communications between the nodes within a determined time period such that nodes receiving the respective packet can verify packets and detect malicious packets or replay attacks. The sequence number can incremented or modified, for example during normal operations, with an integer value generated based in part on a previous sequence number and in response to node event (e.g., node reboot, node reset), the sequence number can incremented or modified with a delta value corresponding to the average number of communications between the nodes within a determined time period. The nodes can write or store the sequence numbers based on determined intervals such that not every sequence number is stored at a storage of the respective nodes of the cluster. For example, in embodiments, the nodes can write the sequence numbers to storage of the respective nodes after determined intervals (e.g., every 24 hours) to reduce the number of write events for the respective nodes and increasing a performance of the nodes and the cluster.

In example embodiments, in response to a node reboot event within the cluster, a first node can initiate a communication (e.g., heartbeat exchange) with the other nodes in the cluster. The node can read or retrieve a previous sequence number (e.g., sender sequence number) stored at a storage of the respective node and adjust (e.g., increment or decrement, etc.) the previous sequence number by a delta value. The delta value can correspond to an average number of communications between the nodes during a determined time period (e.g., 24 hours). In some embodiments, the determined time period and thus the delta value can be selected based in part on a length of time for the node to reboot or upgrade. Thus, the previous sequence number can be adjusted to reflect an expected sequence number that each of the receiving nodes expect to receive in a subsequent communicator after or responsive to the node reboot. After the node reboot is complete, the first node can transmit a packet including the adjusted sequence number to each of the remaining nodes in the cluster. The nodes receiving the respective packet can verify the packet by comparing the adjusted sequence number to an expected sequence number value or threshold number. In embodiments, the receiving nodes can accept the packet if the adjusted sequence number is greater than or equal to an expected sequence number value or threshold number (e.g., if incremented) or if the adjusted sequence number is less than or equal to an expected sequence number value or threshold number (e.g., if decremented). In embodiments, the receiving nodes can reject or drop the packet if the adjusted sequence number is less than an expected sequence number value or threshold number (e.g., if incremented) or if the adjusted sequence number is greater than an expected sequence number value or threshold number (e.g., if decremented). The nodes can write the adjusted sequence number to storage responsive to the node event or at determined time intervals. The adjusted sequence number can be used to prevent replay attacks as receiving nodes can reject or drop nodes having incorrect or maliciously generated sequence numbers. For example, the adjusted sequence number may be used by the plurality of nodes to reset a starting sequence number for communications between the plurality of nodes verifying the packet at receiving nodes of the plurality of nodes and to prevent replay attacks.

In example embodiments, in response to nodes serving traffic within the cluster, each node can maintain at least one receiver sequence number and at least one sender sequence number in a storage the respective node. The receiver sequence number can correspond to a previous or last received sequence number from another node within the cluster. The sender sequence number can correspond to a previous or last transmitted sequence number sent from the respective node to one or more other nodes within the cluster. A node can generate a packet for transmission and retrieve a previous sequence number from the storage of the respective node. The node can increment the previous sequence number by an integer value (e.g., 1) and generate a HMAC digest to be transmitted with the packet. The receiving nodes can perform HMAC authentication and verify the packet based in part on the adjusted sequence number. In embodiments, the receiving nodes can accept the packet if the adjusted (e.g., incremented) sequence number is greater than or equal to an expected receiver sequence number value or threshold number. In embodiments, the receiving nodes can reject or drop the packet if the adjusted (e.g., incremented) sequence number is less than an expected receiver sequence number value or threshold number. In other embodiments, the receiving nodes can accept the packet if the adjusted (e.g., decremented) sequence number is less than or equal to an expected receiver sequence number value or threshold number. In embodiments, the receiving nodes can reject or drop the packet if the adjusted (e.g., decremented) sequence number is greater than an expected receiver sequence number value or threshold number. Thus, the systems and methods described herein can provide protection during nodes events (e.g., cluster node reboots, node upgrades, auto scale deployments) within the cluster and during normal operation (e.g., normal traffic communication) of the cluster using the sequence number generation techniques described herein. The nodes can use the sequence number generation techniques described herein to protect against and/or prevent packet tampering and replay attacks.

Figure 4A:
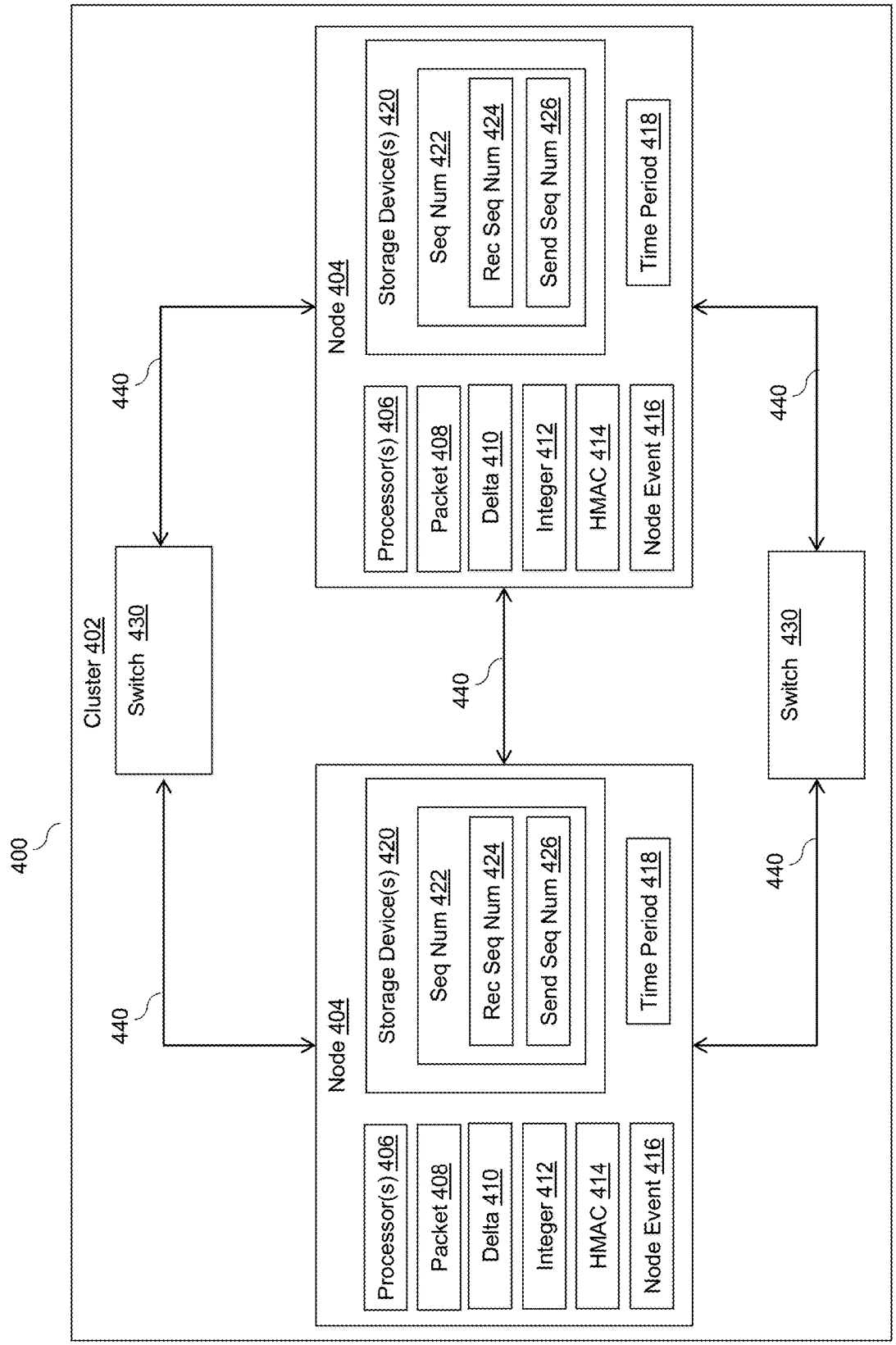
FIG. 4A is a block diagram of an embodiment of a system for preventing replay attacks within in a cluster, according to an example implementation of the present disclosure.

Referring now to FIG. 4A, an example system 400 for preventing replay attacks in a cluster is provided. In brief overview, the system 400 can include a cluster 402 having a plurality of nodes 404 and one or more switches 430 to manage communications between the nodes 404. The cluster 402 can include or be formed from a plurality of connected or distributed computing devices or appliances (e.g., hardware appliances, virtual appliances). In embodiments, the cluster 402 can include a group or plurality of appliances working together as a single system image. The appliances can include single of multi-core appliances. Each of the individual computing devices or appliances can be referred to or correspond to at least one node 404 of the cluster 402. The cluster 402 can include a single node 404 or a plurality of nodes 404. The cluster 402 can include or provide a centralized management system to perform load balancing, distribution, configuration, or other tasks to allow the nodes 404 to operate in conjunction as a single computing system. In embodiments, the cluster 402 may be viewed as a single virtual appliance or computing device. In embodiments, a plurality of appliances (e.g., appliances 200) or other computing devices (e.g., nodes 404) may be joined into a single cluster 402. The cluster 402 can operate as an appliance cluster, application server, network storage server, backup service, or any other type of computing device.

In embodiments, the cluster 402 can include multiple nodes 404 that may be physically grouped, such as a plurality of blade servers in a chassis or plurality of rack mount devices in a single rack, but in other embodiments, the cluster 402 may be distributed in a plurality of chassis, plurality of racks, plurality of rooms in a data center, plurality of data centers, or any other physical arrangement. Accordingly, the cluster 402 may be considered a virtual cluster, grouped via common configuration, management, and purpose, rather than a physical group. A node 404 can include or correspond to an appliance, such as but not limited to, appliance 200 described above with respect to FIGS. 1A-3.

The nodes 404 can include one or more processors 406 such as but not limited to processor(s) 103 described above with respect to FIG. 1C and/or processors 260, 262, 262' described above with respect to FIG. 2. The nodes 404 can include a storage 420 (e.g., storage device, storage unit, memory). For example, the nodes 404 can include a storage 420 or memory coupled with one or more processors 406. The storage 420 can include persistent storage devices or persistent memory. The storage 420 can be the same as or similar to memory 122, 128 described above with respect to FIG. 1C and/or memory 264 described above with respect to FIG. 2. The memory can include a static random access memory (SRAM) as an example.

The nodes 404 can generate and/or store one or more sequence numbers 422 (e.g., nonce generation) in the storage 420 of the respective node 404. The sequence numbers 422 can include an identifier, a value, an index value. In some embodiments, the sequence numbers 422 may be a bit value (e.g., a 64 bit value). The bit value can include numerical values, alphanumeric values, characters, or any combination of numerical values, alphanumeric values and characters. In embodiments, a sequence number 422 can indicate a place, location or order of a packet of a plurality of packets 408 (or heartbeat signals) transmitted between nodes 404 in the cluster 402. For example, the nodes 404 can generate at least one sequence number 422 for each packet 408 or heartbeat signal transmitted in the cluster 402. The sequence numbers 422 can be used to verify an authenticity or integrity of a packet 408 received by a node 404 in the cluster 402. In embodiments, the nodes 404 can write one or more sequence numbers 422 to the storage 420. The nodes 404 can read one or more sequence numbers 422 from the storage 420.

The sequence numbers 422 can include or be stored as a receive sequence number 424. The receive sequence number 424 can include or correspond to sequence numbers 424 included within a packet 408 received at the respective node 404 and generated by a different node 404. For example, a receiving node 404 can identify a sequence number 422 included within a received packet 408 and store or label the sequence number 424 in the respective storage 420 of the node 404 as a receive sequence number 424. The sequence numbers 422 can include or be stored as a send sequence number 426. The send sequence number 426 can include or correspond to sequence numbers 424 included within a packet 408 generated by and transmitted by the respective node 404. For example, a transmitting node 404 can generate a sequence number 422 to be included within a packet 408 to be transmitted and store or label the sequence number 424 in the respective storage 420 of the node 404 as a send sequence number 426.

The nodes 404 can generate and communicate one or more packets 408. The packets 408 can include or correspond to a data packet, a network packet, and/or any form of a unit of data used to transmit data or information from at least one node 404 to one or more other nodes 404 in the cluster 402. The packets 408 can include, but not limited to, commands, instructions, code, frame and/or data structures. The packets 408 can be generated for, based in part on or carrying data in different protocols, including but not limited to, transmission control protocol (TCP) user datagram protocol (UDP), and internet protocol (IP). In some embodiments, the packets 408 can include, but not limited to, protocol data units (PDU), user datagram protocol (UDP) packets, PLCP protocol data units, MAC protocol data units and aggregated MAC protocol data units (AMPDUs)). The packets 408 can include, correspond to or be transmitted with a heartbeat signal. For example, the packets 408 can include or correspond to a periodic signal transmitted from at least one node 404 to one or more other nodes 404 to check or verify operation of a respective node 404, health of a node 404 or synchronize one or more nodes 404.

A node 404 can generate a delta 410 or delta value for a sequence number 422 generated by the respective node 404. The delta 410 can include or correspond to a numerical value or a bit value. The delta 410 can include or corresponds to a number of communications (e.g., heartbeats, packets) within the cluster 402 over a determined time period 418. For example, the delta 410 can include a maximum number of heartbeats exchanged in the determined time period 418. In one embodiment, the delta 410 can correspond to a value of 432,000 representing the number of heartbeats exchanged in a determined time period 418 of 24 hours where 5 heartbeats are exchanged per second in the cluster 402. The delta 410 can vary and be based in part on a number of heartbeats exchanged in a determined time period 418. In some embodiments, the delta 410 can include an average number of heartbeats exchanged in the determined time period 418, a minimum number of heartbeats exchanged in the determined time period 418 or a mean value for a number of heartbeats exchanged in the determined time period 418.

The delta 410 can be used to adjust (e.g., increment, decrement, etc.) a sequence number 422 in response to a node event 416 within the cluster 402. A node event 416 can include but not limited to, a node reboot, a node upgrade, a node deployment (e.g., autoscale deployment within cluster 402), and/or a cluster reboot. In some embodiments, the delta 410 can represent the value of the sequence number 422 if the node event 416 had not occurred. For example, responsive to a node event 416, a node 404 can retrieve a previous sequence number 422 from a storage 420 of the respective node 404 and adjust (e.g., increment, decrement, etc.) the previous sequence number 422 by the delta 410 to generate a new sequence number 422 that corresponds to what the value of a next or subsequent sequence number 422 would have been if the node event 416 had not occurred within the cluster 402 and interrupted communication between the nodes 404. The determined time period 418 can include or correspond to a time period, time interval or time value. For example, the determined time period 418 can include, but not limited to, every 24 hours, every 12 hours, or every 48 hours. The determined time period 418 can vary based in part on the properties of the cluster 402, properties of the nodes 404 and/or the amount of communications within the cluster 402.

A node 404 can generate an integer 412 or integer value for a sequence number 422 generated by the respective node 404. The integer 412 can include or correspond to a numerical value or a bit value. In some embodiments, the integer 412 can be 1. For example, the integer 412 can be used to adjust (e.g., increment or decrement) a sequence number 422 from a previous sequence number 422 used for a communication within the cluster 402. In some embodiments, a node 404 can retrieve a previous sequence number 422 from a storage 420 of the respective node 404 and adjust (e.g., increment or decrement) the previous sequence number 422 by the integer 412 to generate a new sequence number 422 for a next or subsequent communication within the cluster 402. The sequence numbers 422 can be adjusted (e.g., incremented or decremented) to identify an order of the sequence numbers 422 and such that one or more receiving nodes 404 can verify an integrity of the sequence number 422 or packet 408 transmitted with the sequence number 422 to prevent replay attacks or packet tampering.

In some embodiments, the nodes 404 can include a hashed message authentication code (HMAC) 414 with a packet 408. The HMAC 414 can be used to prevent or detect packet tampering. The HMAC 414 can include a keyed HMAC, hash based HMAC or other form of authentication code used to encrypt and/or decrypt packets 408 for transmission within the cluster 402. The HMAC 414 can include cryptographic hash function and/or a cryptographic key used to encrypt a packet 408 for transmission and/or decrypt a packet 408 receiving within the cluster 402. In embodiments, the HMAC 414 can be used for HMAC authentication by one or more receiving nodes 404 receiving a packet 408 having a HMAC 414.

One or more switches 430 can be deployed within the cluster 402. The switches 430 can connect the plurality of nodes 404 together within the cluster 402 and/or connect one or more clusters 402 together. The switch 430 can include a network switch or switching hub executing within the cluster to manage, facilitate or aid in communications between the plurality of nodes 404 of the cluster 402. The switch 430 can include hardware, software or a combination of hardware and software components. The switch 430 can process data at one or more different layers (e.g., 7 layers of the open systems interconnection model (OSI)). In some embodiments, the switch 430 can include a multilayer switch to process data at multiple layers, including but not limited to, the network layer (e.g., layer 3) or data link layer (e.g., layer 2), for a network of the cluster 402.

The nodes 404 can connect with one or more other nodes 404 and/or one or more switches 430 through one or more connections 440. The connections 440 can include a channel, connection or session between one or more nodes 404, switches 430 and/or between one or more nodes 404 and one or more switches 430. In some embodiments, the connections 440 can include encrypted and/or secure connections 440 between one or more nodes 404, switches 430 and/or between one or more nodes 404 and one or more switches 430. For example, the connections 440 may include encrypted sessions and/or secure sessions established between one or more nodes 404, switches 430 and/or between one or more nodes 404 and one or more switches 430. The encrypted connections 440 can include encrypted packets 408, heartbeat signals, sequence numbers 422, files, data and/or traffic transmitted between one or more nodes 404, switches 430 and/or between one or more nodes 404 and one or more switches 430

Each of the above-mentioned elements or entities is implemented in hardware, or a combination of hardware and software, in one or more embodiments. Each component of the nodes 404 may be implemented using hardware or a combination of hardware or software detailed above in connection with FIG. 4. For instance, each of these elements or entities can include any application, program, library, script, task, service, process or any type and form of executable instructions executing on hardware of a node 404. The hardware includes circuitry such as one or more processors in one or more embodiments. In some embodiments, the components of at least one node 404 may be implemented or include a non-transitory computer-readable medium that includes instructions that, when executed by a processor of the respective node 404 cause the processor to execute or perform the functionalities of the method 500.

Figure 4B:
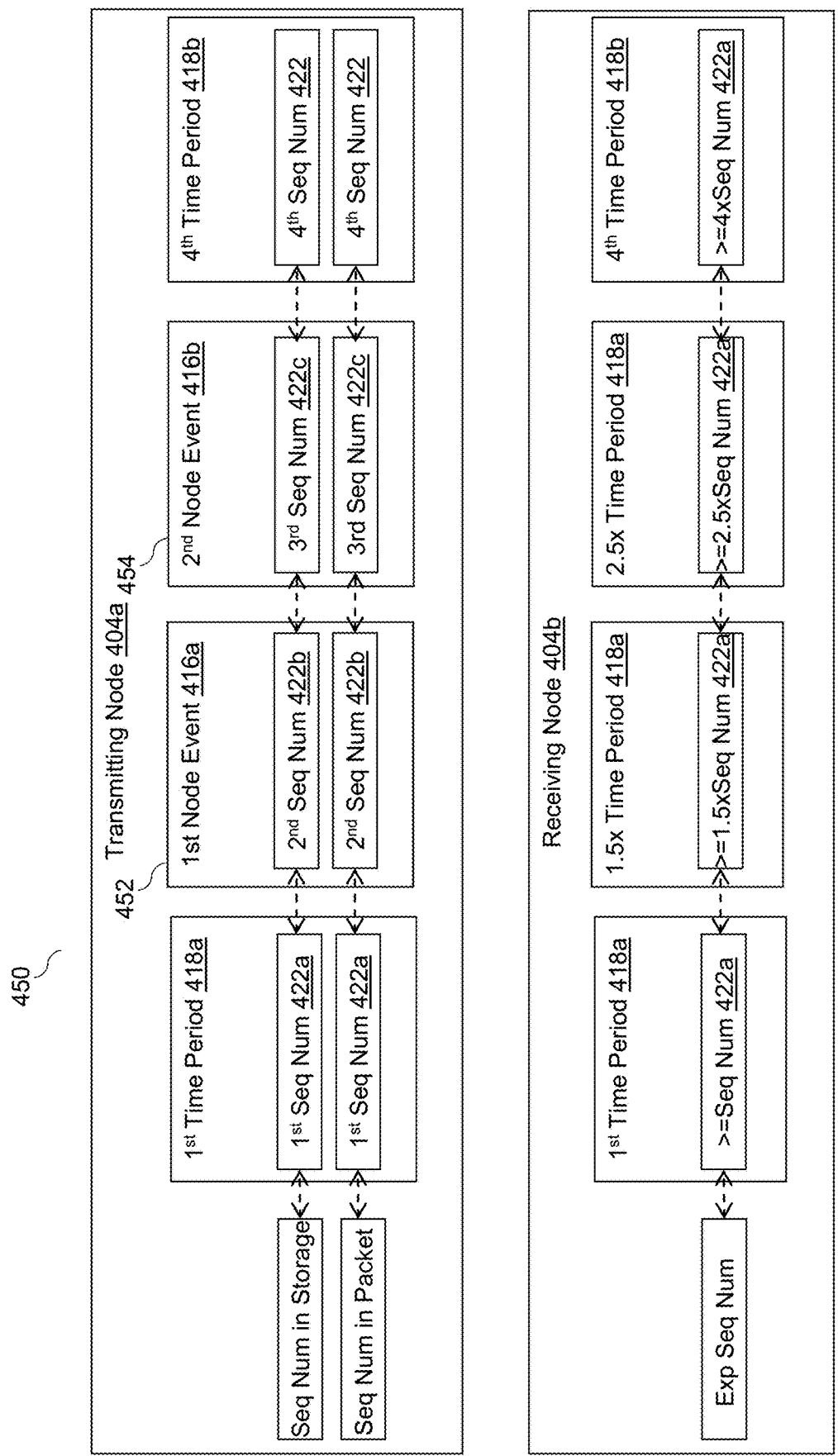
FIG. 4B is a block diagram of an embodiment of communications between nodes in a cluster for preventing replay attacks within in the cluster, according to an example implementation of the present disclosure.

Referring now to FIG. 4B, an example diagram 450 illustrating packet verification between at least two nodes 404 of a cluster 402. In FIG. 4B, the cluster 402 includes a transmitting node 404a and a receiving node 404b. The cluster 402 can include an average number of communications (e.g., packets, heartbeat signals) per time period 418 corresponding to the number of packets 408 transmitted between the plurality of nodes 404 during a respective time period 418. For example, in one embodiment, the nodes 404 of the cluster 402 can average 5 heartbeat signals or packet 408 transmission per second. The time period 418 can correspond to a 24 hour time period 418. Therefore, the average number of communications (e.g., packets, heartbeat signals) per time period 418 for the cluster 402 can be equal to 432,000 communications (e.g., 5×60 sec=300, 300×60 min=18,000, 18,000×24 hours=432,000).

The transmitting node 404a and the receiving node 404b can store a sequence number 422 at intervals corresponding to the determined time period 418 (e.g., every 24 hours). For example, at a first time period 418a, the transmitting node 404 and the receiving node 404 can store a first sequence number 422a corresponding to the average number of communications (e.g., packets, heartbeat signals) can be transmitted between the plurality of nodes 404 forming the cluster 402.

A first node event 416a can occur between at a first point in time 452. The first point in time can include a time between the first period 418a and a fourth time period 418b. For example, the first point in time 452 can correspond to a time value that is 1.5× greater than the first time period 418a. In response to the first node event 416, the transmitting node 404a can access the first sequence number 422a and adjust (e.g., increment, decrement, etc.) the first sequence number 422 by a delta that is equal to the average number of communications transmitted between the plurality of nodes 404 forming the cluster 402 to generate a second sequence number 422b. The transmitting node 404a can generate a packet 408 and include the second sequence number 422b in the packet 408. The transmitting node 404a can transmit the packet 408 with the second sequence number 422b to the receiving node 404 between at the first point in time 452.

The receiving node 404b can receive, access or extract the second sequence number 422b from the packet 408. In embodiments, the receiving node 404b can access the first sequence number 422a from storage or an expected sequence number 422. The expected sequence number 422 can correspond to the previously stored sequence number 422, here the first sequence number 422a, adjusted (e.g., incremented, decremented, etc.) by (e.g., multiplied by) a time factor corresponding to a difference in time between when the previously stored sequence number 422 was received and when the packet 408 with the second sequence number 422b was received. For example, in one embodiment, the time factor can be a factor of 1.5× the first time period 418a value. The receiving node 404b can be expecting a subsequent or second sequence number 422b that is 1.5× times greater than the previously stored sequence number 422, here the first sequence number 422a.

The receiving node 404b can compare the second sequence number 422b to the first sequence number 422a or the expected sequence number 422 to verify the packet 408. If the second sequence number 422b is greater than the first sequence number 422a, the receiving node 404b can determine the packet 408 has not been tampered with and accept the packet 408. If the second sequence number 422b is greater than or equal to the expected sequence number 422, the receiving node 404b can determine the packet 408 has not been tampered with and accept the packet 408. The receiving node 404b can store the second sequence number 422b in a storage 420. In embodiments, the receiving node 404b can update the first sequence number 422a at the storage 420 with the second sequence number 422 such that the second sequence number 422b can be used for future packet verifications to prevent replay attacks and/or packet tampering. In embodiments, the receiving node 404b can reset a previously stored sequence number 422 or expected sequence number 422 at the storage 420 with the second sequence number 422 such that the second sequence number 422b can be used for future packet verifications to prevent replay attacks and/or packet tampering. If the second sequence number 422b is less than the first sequence number 422a or the expected sequence number 422, the receiving node 404b can reject the packet 408. For example, the receiving node 404b can determine the packet 408 has been tampered with or is part of a replay attack.

A second node event 416b can occur between at a second point in time 454. The second point in time can include a time between the first time period 418a and the fourth time period 418b. For example, the second point in time 454 can correspond to a time value that is 2.5× greater than the first time period 418a. In response to the first node event 416, the transmitting node 404a can access the second sequence number 422b and adjust (e.g., increment, decrement, etc.) the second sequence number 422b by a delta that is equal to the average number of communications transmitted between the plurality of nodes 404 forming the cluster 402 to generate a third sequence number 422c. The third sequence number 422c can be greater than the second sequence number 422b and the first sequence number 422a. The transmitting node 404a can generate a packet 408 and include the third sequence number 422c in the packet 408. The transmitting node 404a can transmit the packet 408 with the third sequence number 422c to the receiving node at the second point in time 454.

The receiving node 404b can receive, access or extract the third sequence number 422c from the packet 408. In embodiments, the receiving node 404b can access the second sequence number 422b from storage or an expected sequence number 422. The expected sequence number 422 can correspond to the previously stored sequence number 422, here the first sequence number 422a, adjusted (e.g., incremented, decremented, etc.) by (e.g., multiplied by) a time factor corresponding to a difference in time between when the previously stored sequence number 422 was received and when the packet 408 with the second sequence number 422b was received. For example, in one embodiment, the time factor at the second point in time 454 can be a factor of 2.5× the first time period 418a value. The receiving node 404b can be expecting a subsequent or second sequence number 422b that is 2.5× times greater than the previously stored sequence number 422 or first sequence number 422.

The receiving node 404b can compare the third sequence number 422c to the second sequence number 422b or the expected sequence number 422 to verify the packet 408. If the third sequence number 422c is greater than the second sequence number 422b, the receiving node 404b can determine the packet 408 has not been tampered with and accept the packet 408. If the third sequence number 422c is greater than or equal to the expected sequence number 422, the receiving node 404b can determine the packet 408 has not been tampered with and accept the packet 408. The receiving node 404b can store the third sequence number 422b in a storage 420. In embodiments, the receiving node 404b can update the second sequence number 422b at the storage 420 with the third sequence number 422c such that the third sequence number 422c can be used for future packet verifications to prevent replay attacks and/or packet tampering. In embodiments, the receiving node 404b can reset a previously stored sequence number 422 or expected sequence number 422 at the storage 420 with the third sequence number 422c such that the third sequence number 422c can be used for future packet verifications to prevent replay attacks and/or packet tampering.

If the third sequence number 422c is less than the second sequence number 422b or the expected sequence number 422, the receiving node 404 can reject the packet 408. For example, the receiving node 404b can determine the packet 408 has been tampered with or is part of a replay attack. The nodes 404 can continually generate new sequence numbers 422 for future or subsequent communications that are incremented or modified based in part on a previous sequence number and/or an average number of communications between the nodes 404 of the cluster 402 within a determined time period 418 such that nodes 404 receiving the respective packet 408 can verify packets and detect malicious packets or replay attacks.

Figure 5A:
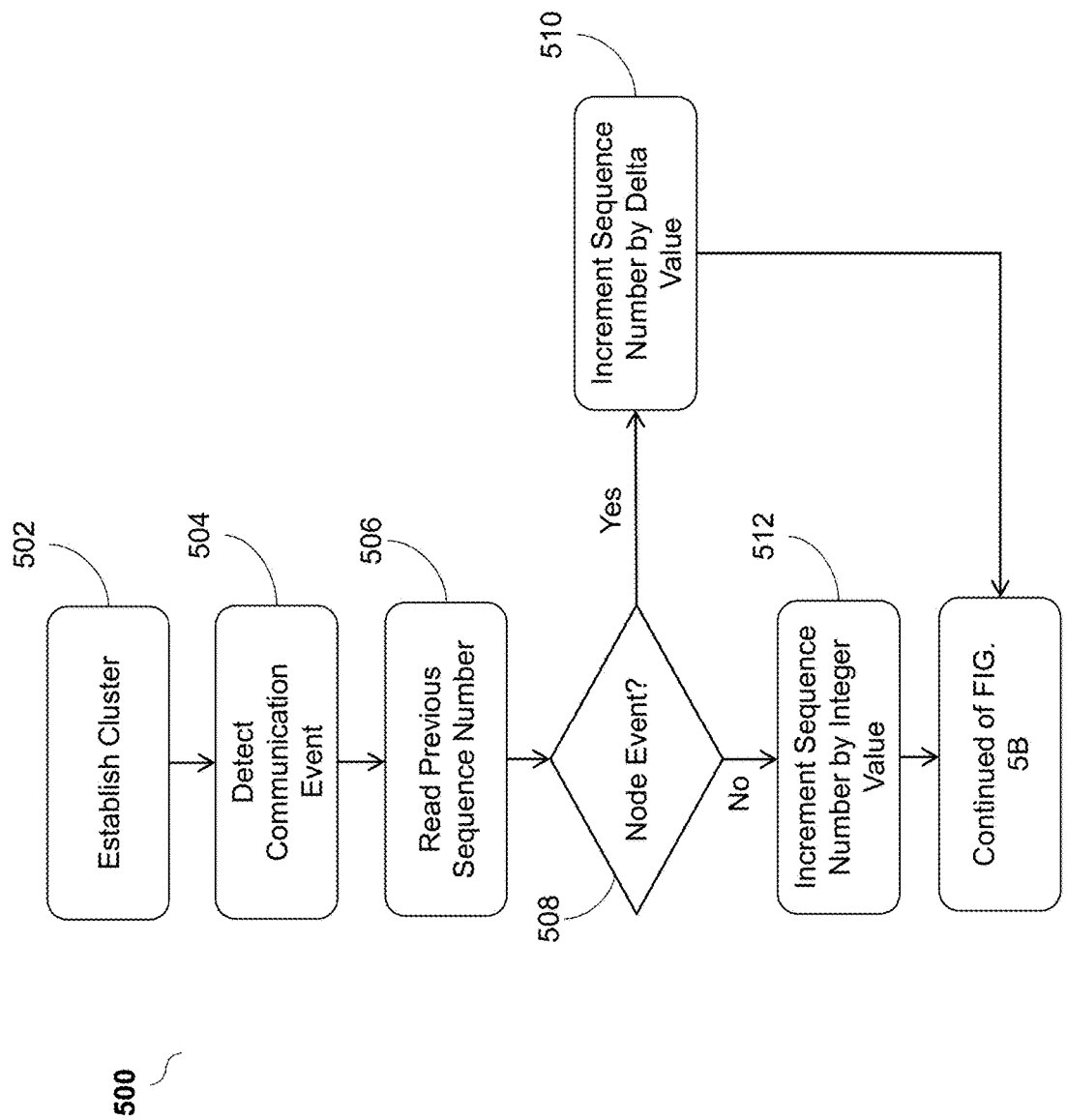
FIGS. 5A-5B include a flow chart illustrating a process or method for preventing replay attacks within a cluster, according to an example implementation of the present disclosure.
Figure 5B:
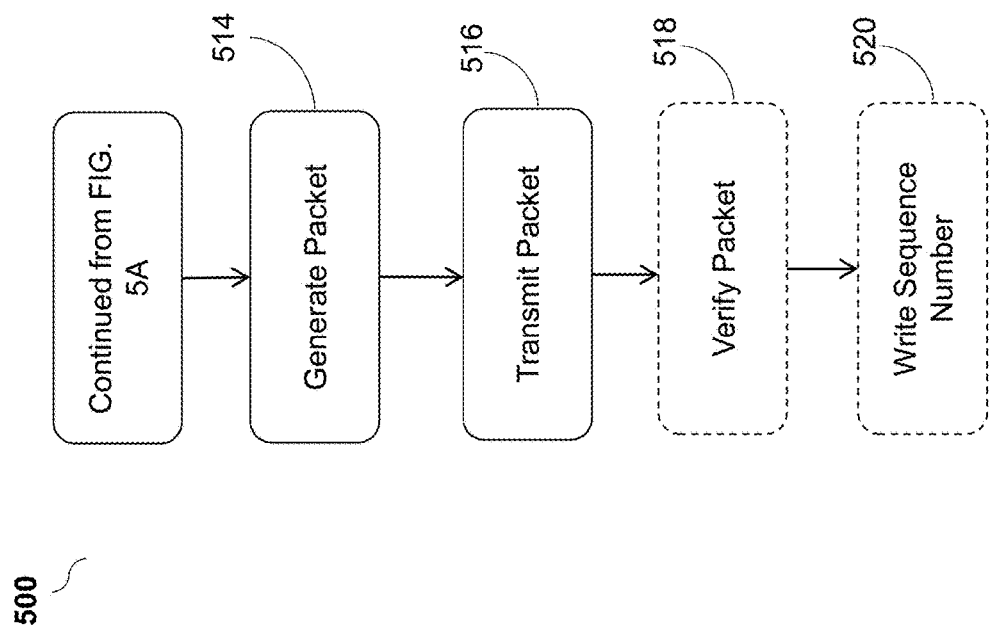

Referring now to FIGS. 5A-5B, a method 500 for preventing replay attacks is depicted. In brief overview, the method 500 can include one or more of: establishing a cluster (502), detected a communication event (504), reading a previous sequence number (506), determining if a node event occurred (508), if so, adjusting (e.g., incrementing) a sequence number by a delta value (510), if not, adjusting (e.g., incrementing) a sequence number by an integer value (512), generating a packet (514), transmitting a packet (516), verifying a packet (518), and writing the sequence number (520). Any of the foregoing operations may be performed by any one or more of the components or devices described herein, for example, one or more nodes 404.

Referring to 502, and in some embodiments, a cluster 402 can be established. The cluster 402 can include a plurality of nodes 404 (e.g., application delivery controllers (ADCs)). The nodes 404 can include or correspond to appliances (e.g., application delivery controllers (ADCs). In embodiments, a plurality of nodes 404 can be grouped together to form the cluster 402. In some embodiments, the cluster 402 can be one cluster 402 of a plurality of clusters 402 forming a multi-cluster environment. The cluster 402 can include one or more switches 430 to control, manage and/or facilitate communications between the nodes 404 in the cluster. The nodes 404 can establish one or more connections 440 (e.g., encrypted connections) to one or more other nodes 404 in the cluster 402. The nodes 404 can establish one or more connections 440 (e.g., encrypted connections) to one or more switches in the cluster 402.

Referring to 504, and in some embodiments, a communication event can be detected. A communication event can include the transmission of at least one packet 408 from a node 404 to one or more other nodes 404 in the cluster 402. The communication event can include the reception of at least one packet 408 or heartbeat signal by a node 404 from a different node 404. For example, a first node 404 can generate a packet 408 or heartbeat signal and a sequence number 422 for the packet 408 or heartbeat signal. The first node 404 can transmit the packet or heart signal with the sequence number 422 to one or more other nodes 404, including a second node 404 in the cluster 402.

Referring to 506, and in some embodiments, a previous sequence number can be accessed or read. A node 404 can access, read or retrieve a previous sequence number 422 from a storage 420 of the respective node 404. The node 404 can access the last or previous sequence number 422 stored or written to the storage 420. The previous sequence number 422 can include or correspond to a sequence number 422 included within a packet 408 transmitted by the respective node 404 or received at the respective node 404 and written to the storage 420. The previous sequence number 422 can include or correspond to the last stored or last written sequence number 422 by the node 404 to the storage 420. In some embodiments, a first node 404 in the cluster 402 having a plurality of nodes 404 can receive an indication of a node event 416 within the cluster 402. The first node 404 can access a first sequence number 422 from a storage 420 of the first node 404. The first sequence number 422 can be associated with, include or correspond to a previous communication between the plurality of nodes 404 in the cluster 402. For example, the first sequence number 422 can include or correspond to last stored or most recently stored sequence number 422 in the storage 420 that was included within a packet 408 transmitted by the first node 404 or received by the first node 404. The first sequence number 422 can include or correspond to a last stored or most recently stored sequence number 422 in the storage 420 stored based in part on a periodic or determined time period 418.

Nodes 404 can store or write sequence numbers 422 at determined time periods 418. The determined time periods 418 can include regular intervals or periodic storage of sequence numbers 422. For example, the nodes 404 can store or write sequence numbers 422 to a storage 420 periodically such as, but not limited to, every 24 hours, every 12 hours or another determined time period 418. In embodiments, the nodes 404 can perform periodic storage of sequence numbers 422 such that at the periodic time periods 418, a node 404 can store the most recently received sequence number 422 (e.g., last sequence number, previous sequence number) included with the most recently received packet 408 at a storage 420 of the respective node 404. In some embodiments, the nodes 404 can store or write sequence numbers 422 to a storage 420 at periodic time periods 418 such that not each received sequence number 422 for each received packet 408 is stored. The nodes 404 can store sequence numbers 422 based in part on the same determined time periods 418 or periodic schedule to synchronize the most recently stored or last stored sequence numbers 422 at the nodes 404 of the cluster 402.

Referring to 508, and in some embodiments, a determination can be made if a node event occurred. The first node 404 can determine if a node event 416 occurred within the cluster 402 or if a node event 416 occurred involving at least one node 404 of the cluster 402. For example, the first node 404 can determine if the communication event was in response to, caused by or associated with a node event 416. The node event 416 can include a node reboot, node upgrade, a node deployment or other form of reboot within the cluster 402. In some embodiments, the first node 404 can receive an indication that a node event 416 occurred. For example, an administrator, a switch 430 or a master node 404 in the cluster 402 can transmit an indication to the nodes 404 of the cluster 402 when a node event 416 occurs. In some embodiments, the indication can identify the one or more nodes 404 associated with or involved in the node event 416.

Referring to 510, and in some embodiments, first node 404 can determine that a node event 416 occurred. The first node 404 can adjust (e.g., increment) the previous sequence number 422 by a delta 410 indicative of an average number of communications between the plurality of nodes 404 in the cluster 402 in a determined time period 418 to generate a second sequence number 422. In embodiments, communications can include or refer to exchanges of packets 408 or heartbeat signals between nodes 404 in the cluster 402. The first node 404 can determine a maximum number of communications, a minimum number of communications or an average number of communications between nodes 404 in the cluster for the determined time period 418. The first node 404 can generate or derive the delta 410 to correspond to or be equal to the maximum number of communications, the minimum number of communications or the average number of communications between nodes 404 in the cluster for the determined time period 418. The first node 404 can modify or apply the delta 410 to the previous sequence number 422 or first sequence number 422 read from the storage 420 of the first node 404 to generate a new or second sequence number 422. The first node 404 can adjust (e.g., increment) the previous sequence number 422 or first sequence number 422 by the delta 410 to generate a new or second sequence number 422.

The delta 410 can be used to generate an expected sequence number 422 corresponding to a sequence number 422 that the first node 404 may have missed during the node event 416. For example, in some embodiments, the node event 416 can cause the first node 404 to be out of service or reboot for a time period (e.g., rebooting, restarting) and thus, may have missed one or more sequence numbers 422 included within a packet 408 (e.g., heartbeat signal) transmitted within the cluster 402 while the first node 404 was out of service. One or more receiving nodes 404 can be expecting to receive a particular sequence number 422, such as a sequence number 422 transmitted while the first node 404 involved in the node event 416 was out of service and/or rebooting. The first node 404 can apply the delta 410 to a previous sequence number 422 the first node 404 had stored to generate a second or subsequent sequence number 422 that is the same as or corresponds to the particular sequence number 422 the one or more receiving nodes 404 are expecting to receive.

Referring to 512, and in some embodiments, first node 404 can determine that a node event 416 did not occur. The first node 404 can determine that a node event 416 did not occur and that the communication event was not in response to a node event 416. The first node 404 can adjust (e.g., increment) the previous sequence number 422 by an integer 412. The integer 412 can be generated based in part on the previous sequence number 422. For example, the first node 404 can generate the integer 412 as a numerical value or a bit value. In some embodiments, the integer 412 can be 1. The first node 404 can apply the integer 412 to the previous sequence number 422 or the first sequence number 422 to generate a subsequent sequence number 422 or second sequence number 422. In embodiments, the first node 404 can adjust (e.g., increment) the previous sequence number 422 or the first sequence number 422 using the integer 412 to generate a subsequent sequence number 422 or second sequence number 422. The first node 404 can adjust (e.g., increment) the previous sequence number 422 or the first sequence number 422 by the integer (e.g., 1) to increase the previous sequence number 422 or the first sequence number 422 by the integer 412 value and generate a next, subsequent or second sequence number 422 that corresponds to a next, expected sequence number 422 for communications between the nodes 404 of the cluster 402.

Referring to 514, and in some embodiments, a packet 408 can be generated. The first node 404 can generate a packet 408. In some embodiments, the packet 408 can include or correspond to a heartbeat signal. The packet 408 can include information or data for the first node 404, including but not limited to, a status, a health, or connection data for the respective node 404. The first node 404 can include the subsequent sequence number 422 or second sequence number 422 in the packet 408. In some embodiments, the first node 404 can insert the subsequent sequence number 422 or second sequence number 422 into a portion of the packet 408, such as but not limited to a header of the packet 408. In some embodiments, the first node 404 can encrypt the packet 408 and/or the data included within the packet 408. The first node 404 can generate and include an authentication code with the packet 408. The authentication code can include or correspond to a HMAC authentication code.

Referring to 516, and in some embodiments, a packet 408 can be transmitted. The first node 404 can transmit the packet 408 to one or more nodes 404 of the cluster 402 through one or more switches 430 and one or more connections 440. In some embodiments, the first node 404 can transmit the packet 408 to each node 404 in the cluster 402 through one or more switches 430 and one or more connections 440. The first node 404 can transmit the packet 408 with the subsequent sequence number 422 or second sequence number 422 included with the packet 408. In some embodiments, the first node 404 can transmit the packet 408 and the subsequent sequence number 422 or second sequence number 422 separately to the one or more nodes 404 of the cluster 402.

In some embodiments, the first node 404 can transmit the packet 408 and the subsequent sequence number 422 or second sequence number 422 through one or more encrypted connections 440 to one or more nodes 404. The first node 404 can transmit the packet 408 with the subsequent sequence number 422 or second sequence number 422 inserted into the packet 408 through one or more encrypted connections 440 to one or more nodes 404. In some embodiments, the first node 404 can transmit the packet 408 and the subsequent sequence number 422 or second sequence number 422 separately to the one or more nodes 404 of the cluster 402 through encrypted connections 440 to one or more nodes 404.

Referring to 518, and in some embodiments, a packet 408 can be verified. One or more nodes 404 can receive the packet 408 (e.g., receiving node) from the first node 404. The nodes 404 receiving the packet 408 can verify the packet 408 prior to accepting or storing the packet 408. In some embodiments, a node 404 receiving the packet 408 can decrypt the packet 408. The receiving node 404 can verify the packet 408 using HMAC authentication. For example, the receiving node 404 can use a message authentication code and execute a hash function to verify an integrity of the packet 408. In some embodiments, the receiving node 404 can receive the authentication code for the HMAC authentication from the first node 404 or node 404 that transmitted the respective packet 408.

In some embodiments, a receiving node 404 can verify a packet 408 using the sequence number 422. The receiving node 404 can identify, retrieve or extract the subsequent sequence number 422 or second sequence number 422 from the packet 408. The receiving node 404 can compare the subsequent sequence number 422 or second sequence number 422 to an expected sequence number 422. The expected sequence number 422 can correspond to one or more previous sequence numbers 422 used in communications within the cluster 402. For example, the communications in the cluster 402 can ordered using sequence numbers 422. Thus, each next or subsequent sequence number 422 can have a relationship (e.g., numerical, linear) to one or more previous sequence numbers 422 or one or more previously stored sequence numbers 422. A receiving node 404 can generate or determine the expected sequence number based in part on one or more previous sequence numbers 422 or one or more previously stored sequence numbers 422.

In some embodiments, the expected sequence number 422 can be equal to a previous sequence number 422 or previously stored sequence number 422 adjusted (e.g., incremented) by the delta 410 if a node event 416 has occurred. In some embodiments, the expected sequence number 422 can be equal to a previous sequence number 422 or previously stored sequence number 422 adjusted (e.g., incremented) by the integer 412, for example, if a node event 416 did not occur. The receiving node 404 can compare the subsequent sequence number 422 or second sequence number 422 received from the first node 404 to the expected sequence number 422. If the subsequent sequence number 422 or second sequence number 422 received from the first node 404 matches the expected sequence number 422, the receiving node 404 can determine the packet 408 is verified. The receiving node 404 can write or store the packet 408 to a storage 420 of the receiving node 404. If the subsequent sequence number 422 or second sequence number 422 received from the first node 404 does not match the expected sequence number 422, the receiving node 404 can reject the packet 408. For example, the receiving node 404 can determine the packet 408 has been tampered with or is part of a replay attack.

Referring to 520, and in some embodiments, a sequence number 422 can be stored or written. The nodes 404 can store or write the sequence number 422 at determined time periods 418. In embodiments, the nodes can store the second sequence number 422 to storage 420 periodically such as, but not limited to, every 24 hours, every 12 hours or another determined time period 418. In embodiments, the nodes 404 can store sequence numbers 422 based in part on the same determined time periods 418 or periodic schedule to synchronize the most recently stored or last stored sequence numbers 422 at the nodes 404 of the cluster 402. The nodes 404 receiving the second sequence number 422 can reset a starting sequence number 422 or update the previous stored sequence number 422 such that the second sequence number 422 is used to verify future or subsequent packets 408 received from other nodes 404 in the cluster 402.

Figure 5C:
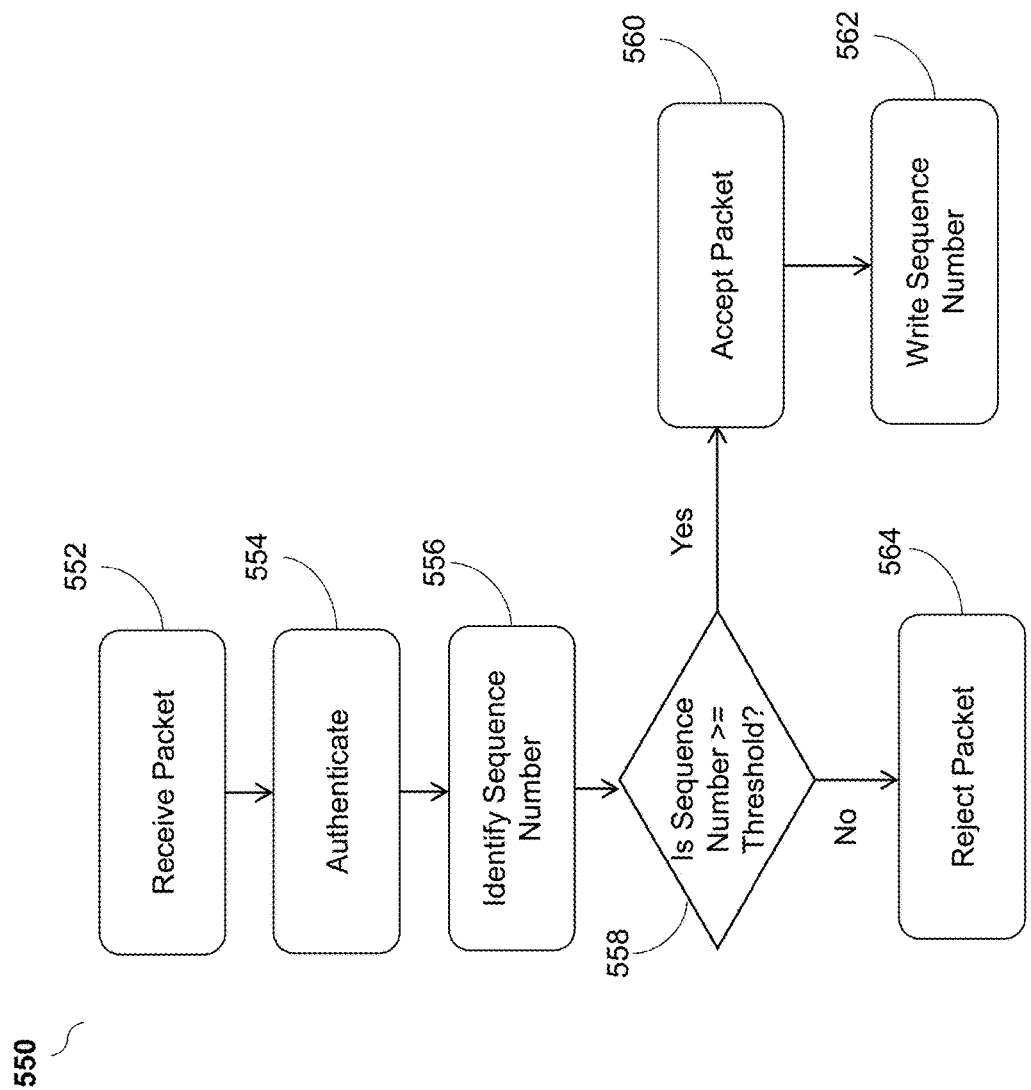
FIG. 5C includes a flow chart illustrating a process or method for preventing replay attacks within a cluster, according to an example implementation of the present disclosure.

Referring now to FIG. 5C, a method 550 for preventing replay attacks is depicted. In brief overview, the method 550 can include one or more of: receiving a packet (552), authenticating the packet (554), identifying a sequence number (556), comparing the sequence number to a threshold (558), if the sequence number is greater than or equal to the threshold, accepting the packet (560), writing the sequence number (562), and if the sequence number is less than the threshold, rejecting the packet (564).

Referring to 552, and in some embodiments, a packet can be received. A first node 404 in a cluster 402 can receive a packet 408 from a second node 404 in the cluster 402. The first node 404 can receive the packet 408 in response to or after a node event 416 that involves or includes at least one node 404 of the cluster 402. In some embodiments, the second node 404 can transmit the packet 408 after the node event 416. The node event 416 can include or correspond to a reboot, upgrade or deployment of the second node 404.

Referring to 554, and in some embodiments, a packet can be authenticated. The first node 404 can authenticate the packet 408. For example, the first node 404 can perform HMAC authentication using an authentication code or key received from the second node 404 or the node 404 that transmitted the packet 408. The second node 404 can transmit a keyed hash message authentication code with or separately from the packet 408 to the first node 404. In some embodiments, the first node 404 can use the authentication code and a key (e.g., cryptographic key) to authenticate the packet 408. In embodiments, the first node 404 can execute or perform a hash function using the authentication code and a key (e.g., cryptographic key) to authenticate the packet 408.

Referring to 556, and in some embodiments, a sequence number can be identified. The first node 404 can identify, receive or extract a sequence number 422 from the packet 408. The sequence number 422 can be inserted or included within the packet 408. For example, the sequence number 422 can be inserted or included within header portion of the packet 408. In some embodiments, the first node 404 can receive the sequence number 422 for the packet 408 separately from the packet 408.

Referring to 558, and in some embodiments, a sequence number can be compared to a threshold. The first node 404 can compare the sequence number 422 to a threshold. The threshold can include or correspond to an expected sequence number or a range of sequence numbers. For example, the threshold can correspond to one or more previous sequence numbers 422 used in communications within the cluster 402. The packets 408 received within the cluster 402 can include sequence numbers 422 that are generated having a relationship (e.g., numerical, linear) to one or more previous sequence numbers 422 or one or more previously stored sequence numbers 422. The threshold can correspond to an expected sequence number based on a previous sequence number or previously stored sequence number and a time period 418 between the previous sequence number or previously stored sequence number and the most recent sequence number 422 received with the packet 408. In some embodiments, the threshold can include delta 410 that is used to adjust (e.g., increment) a previous sequence number 422 after or responsive to a node event 416. The first node 404 can compare the sequence number 422 from the packet 408 to the threshold to verify the packet 408.

In some embodiments, the expected sequence number 422 can be equal to a previous sequence number 422 or previously stored sequence number 422 adjusted (e.g., incremented) by the delta 410 if a node event 416 has occurred. In some embodiments, the expected sequence number 422 can be equal to a previous sequence number 422 or previously stored sequence number 422 adjusted (e.g., incremented) by the integer 412, for example, if a node event 416 did not occur.

The receiving node 404 can compare the subsequent sequence number 422 or second sequence number 422 received from the first node 404 to the expected sequence number 422. If the subsequent sequence number 422 or second sequence number 422 received from the first node 404 matches the expected sequence number 422, the receiving node 404 can determine the packet 408 is verified. The receiving node 404 can write or store the packet 408 to a storage 420 of the receiving node 404.

Referring to 560, and in some embodiments, if the sequence number is greater than or equal to the threshold, the packet can be accepted. The first node 404 can determine that the sequence number 422 is equal to or greater than the threshold. The first node 404 can accept or receive the packet 408 responsive to the sequence number 422 being equal to or greater than the threshold. In some embodiments, the first node 404 can determine that the packet 408 was and has not been tampered with or used in a replay attack based in part on the comparison to the threshold.

Referring to 562, and in some embodiments, the sequence number can be written to a storage. The first node 404 can write or store the sequence number 422 to a storage 420 of the first node 404. In some embodiments, the first node 404 can remove a previous sequence number 422 stored in the storage 420 and replace the previous sequence number 422 with the sequence number 422 received with the most recent accepted packet 408.

In some embodiments, the first node 404 can store the sequence number 422 responsive to a determined time period 418. For example, the first node 404 can store a most recently received sequence number 422 at periodic intervals according to a determined time period 418 (e.g., every 24 hours). The first node 404 can detect that the time period 418 is over or that a current time corresponds to an interval of the time period 418 and determine that is time to write a most recently received sequence number 422 to the storage 420 using the determined time period 418. The first node 404 can remove a previous sequence number 422 stored in the storage 420 and replace the previous sequence number 422 with the sequence number 422 received with the most recent accepted packet 408 at the determined time period 418. In some embodiments, the first node 404 can provide an indication or instruction to store a most recently received sequence number 422, for example, from a master node 404 of the cluster 402, a switch 430, or an administrator.

The first node 404 and/or one or more nodes 404 in the cluster 404 can periodically store and write sequence numbers 422 to respective storage 420 based in part on the determined time period 418. In some embodiments, at the periodic intervals of the time period 418, the first node 404 and/or one or more nodes 404 in the cluster 404 can store and write sequence numbers 422 to respective storage 420. In embodiments, the nodes 404 of the cluster 404 can be synchronized and store sequence numbers 422 at the same periodic intervals of the time period 418.

Referring to 564, and in some embodiments, if the sequence number is less than the threshold, the packet can be rejected. The first node 404 can determine that the sequence number 422 is less than the threshold and reject the packet 408 or refuse to accept the packet 408. In some embodiments, responsive to the comparison to the threshold, the first node 404 can determine that the packet 408 has been tampered with or was not generated by a node 404 of the cluster 402. For example, the first node 404 can determine that sequence number 422 of the packet 408 is less than an expected sequence number 422 or different than an expected sequence number 422 indicating an improperly generated packet 408 and/or a packet 408 intended to be used in a replay attack. The first node 404 can reject the packet 408 based in part on the improper sequence number 422.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of" 'A' and 'B' can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a first node in a cluster having a plurality of nodes, an indication of a node event of the cluster that causes a missed sequence number in communications between the plurality of nodes in the cluster;
accessing, by the first node, a first sequence number from a storage, the first sequence number associated with a previous communication between the plurality of nodes in the cluster;
adjusting, by the first node responsive to the node event that causes the missed sequence number in the communications between the plurality of nodes in the cluster, the first sequence number by a delta that is established based at least in part on an average number of communications between the plurality of nodes in the cluster in a determined time period to generate a second sequence number;
storing, by the first node, the second sequence number to the storage responsive to the node event; and
transmitting, by the first node, a packet including the second sequence number to the plurality of nodes in the cluster, the second sequence number used by the plurality of nodes to reset a starting sequence number for communications between the plurality of nodes to prevent replay attacks in the cluster based on the missed sequence number in the communications between the plurality of nodes in the cluster.

2. The method of claim 1, wherein the node event includes at least one of a node reboot, a node reset, a node upgrade or a node deployment of the cluster.

3. The method of claim 1, comprising generating the second sequence number as a nonce sequence number having a 64 bit value.

4. The method of claim 1, comprising:
encrypting, by the first node, the packet including the second sequence number; and
transmitting, by the first node, the packet with a hash-based message authentication code to the plurality of nodes of the cluster.

5. The method of claim 1, comprising:
receiving, by nodes of the plurality of nodes, the packet including the second sequence number; and
storing, by the nodes of the plurality of nodes and responsive to the node event, the second sequence numbers to storage of the respective nodes.

6. The method of claim 1, comprising storing, by each node of the plurality of nodes, subsequent sequence numbers used in communication between the plurality of nodes to storage of the respective nodes at intervals corresponding to the determine time period.

7. The method of claim 1, comprising:
determining, by the first node, the average number of communications between the plurality of nodes in the cluster in the determined time period; and
multiplying, by the first node, the average number of communications by the determined time period to generate the delta.

8. The method of claim 1, comprising:
authenticating, by a second node of the plurality of nodes, the packet using a hash-based message authentication code, the packet including the second sequence number;
determining, by the second node, the second sequence number is greater than the threshold number; and
storing, by the second node responsive to the node event and the determination, the second sequence number to a storage of the second node.

9. The method of claim 1, comprising:
generating, by the first node, a second packet for transmission to the plurality of nodes of the cluster independent of the node event;
accessing, by the first node, the second sequence number from the storage of the first node;
adjusting, by the first node, the second sequence number by an integer value to generate a third sequence number, the integer value less than the delta; and
transmitting, by the first node, a second packet including the third sequence number to the plurality of nodes in the cluster.

10. The method of claim 9, comprising:
receiving, by one or more nodes of the plurality of nodes, the second packet including the third sequence number; and
comparing, by the one or more nodes, the third sequence number to the second sequence number to determine if the third sequence number is greater than the second sequence number.

11. The method of claim 10, comprising:
accepting, by the one or more nodes, the second packet responsive to determining that the third sequence number is greater than the second sequence number.

12. The method of claim 10, comprising:
rejecting, by the one or more nodes, the second packet responsive to determining the third sequence number is less than the second sequence number.

13. A method comprising:
receiving, by a first node in a cluster having a plurality of nodes, a packet from a second node in the cluster responsive to a node event of the cluster that causes a missed sequence number in communications between the plurality of nodes in the cluster;
identifying, by the first node, a first sequence number included within the packet;
accessing, by the first node, a second sequence number from a storage, the second sequence number indicative of a sequence number used in a previous communication between the plurality of nodes in the cluster;
adjusting, by the first node responsive to the node event that causes the missed sequence number in the communications between the plurality of nodes in the cluster, the second sequence number by a delta that is established based at least in part on an average number of communications between the plurality of nodes in the cluster in a determined time period to generate a threshold number; and
comparing, by the first node, the first sequence number to the threshold number to determine if the sequence number is greater than or less than the threshold number and process the packet at the first node when the sequence number is greater than or less than the threshold number.

14. The method of claim 13, comprising:
accepting, by the first node, the packet responsive to determining that the first sequence number is greater than the threshold number; and
storing, by the first node responsive to the node event, the first sequence number to the storage of the first node to replace the second sequence number.

15. The method of claim 13, comprising:
rejecting, by the first node, the packet responsive to determining the sequence number is less than the threshold number.

16. The method of claim 13, comprising:
receiving, by multiple nodes of the plurality of nodes, the packet from the second node in the cluster responsive to the node event of the cluster, the packet including the first sequence number; and
storing, by each of the multiple nodes, the first sequence number to storage of the respective node responsive to determining that the first sequence number is greater than the threshold number at the determined time interval.

17. The method of claim 13, comprising:
storing, by each node of the plurality of nodes, subsequent sequence numbers used in communication between the plurality of nodes to storage of the respective nodes at intervals corresponding to the determine time period.

18. A system comprising:
a first node in a cluster having a plurality of nodes, the first node comprising one or more processors coupled to memory; and
the one or more processors configured to:
receive an indication of a node event of the cluster that causes a missed sequence number in communications between the plurality of nodes in the cluster;
access a first sequence number from a storage, the first sequence number associated with a previous communication between the plurality of nodes in the cluster;
adjust, responsive to the node event that causes the missed sequence number in the communications between the plurality of nodes in the cluster, the first sequence number by a delta that is established based at least in part on average number of communications between the plurality of nodes in the cluster in a determined time period to generate a second sequence number;
store the second sequence number to the storage responsive to the node event; and
transmit a packet including the second sequence number to the plurality of nodes in the cluster, the second sequence number used by the plurality of nodes to reset a starting sequence number for communications between the plurality of nodes to prevent replay attacks in the cluster based on the missed sequence number in the communications between the plurality of nodes in the cluster.

19. The system of claim 18, wherein the one or more processors are configured to:
encrypt the packet including the second sequence number; and
transmit the packet with a hash-based message authentication code to the plurality of nodes of the cluster.

20. The system of claim 18, wherein the one or more processors are configured to:
determine the average number of communications between the plurality of nodes in the cluster in the determined time period; and
multiply the average number of communications by the determined time period to generate the delta.

* * * * *